July 21, 1942.  H. W. KRANZ  2,290,285

FREE WHEELING DEVICE FOR BICYCLES

Filed July 26, 1940

INVENTOR.
HARRY W. KRANZ
BY
Oberlin, Limbach & Day
ATTORNEYS.

Patented July 21, 1942

2,290,285

UNITED STATES PATENT OFFICE 2,290,285

FREEWHEELING DEVICE FOR BICYCLES

Harry W. Kranz, Lakewood, Ohio, assignor to The Cleveland Welding Company, Cleveland, Ohio, a corporation of Ohio Application July 26, 1940, Serial No. 347,669

1 Claim. (Cl. 192—64)

This invention relates as indicated to free wheeling devices for bicycles, and more particularly to a form of such device which is adapted to withstand rough treatment. The device of this invention is also particularly suited for use in conjunction with hydraulic braking means such as that, for example, disclosed in application Serial No. 323,773 of Homer L. Mueller, filed March 13, 1940.

Free wheeling devices of various sorts have long been employed in bicycles, notwithstanding which fact they are a frequent source of trouble. Metal balls of the ball bearing type have generally been employed, often being mounted in such manner that when the sprocket is in driving engagement with the hub such balls are forced outwardly within the shell of the hub. After a relatively short period of use distortion of the surfaces engaged frequently results and the device becomes noisy and unreliable in operation. Furthermore, the metal balls tend to wear rapidly and the whole assembly becomes loose. Such difficulties are especially apparent when the free wheeling device is employed in conjunction with hydraulic braking mechanism and it is therefore a primary object of this invention to provide a free wheeling device for bicycles and the like which will be of simple, rugged construction and able to support the stresses which are encountered in use.

Another object of this invention is to provide such a device which will produce less distortion of the surfaces engaged and be substantially noiseless in operation.

A further object of this invention is to provide an assembly in which the free wheeling device and one set of the main wheel bearings mutually support each other.

Other objects of the invention will appear as the description proceeds.

To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

Figure 1:
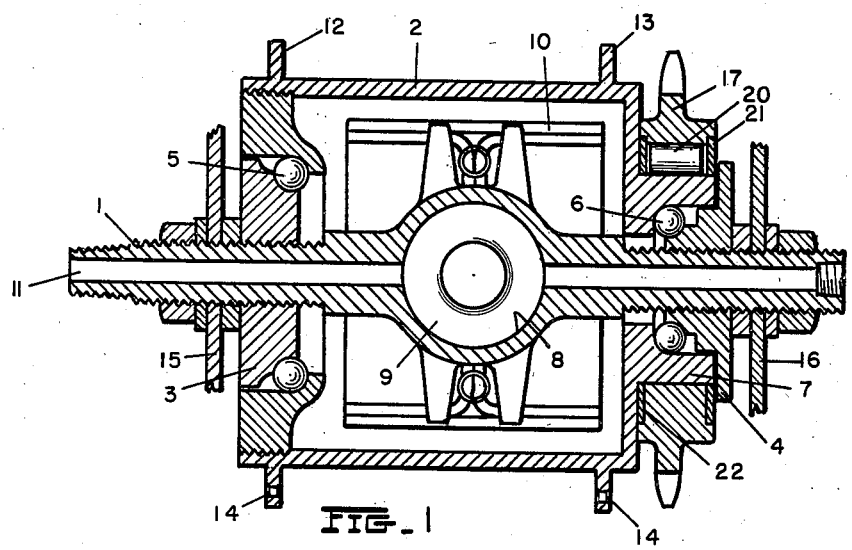
Figure 2:
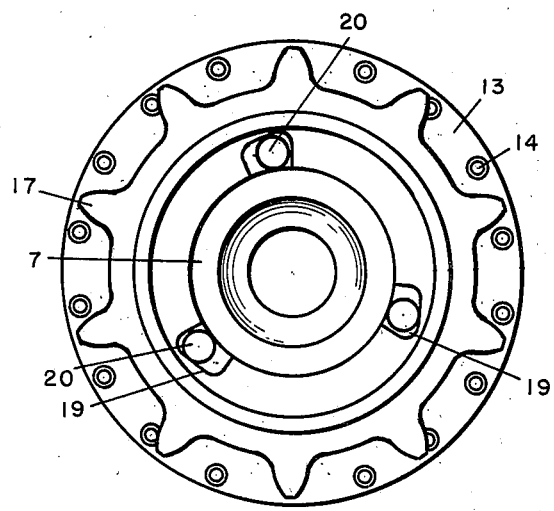

In said annexed drawing:

Fig. 1 is a sectional view through the hub and axle of a bicycle wheel showing my new device; and Fig. 2 is an axial, elevational view of such device and hub with the axle and bearings removed.

Referring now more particularly to said drawing, the device of my invention comprises an axle 1 on which a hub 2 is rotatably mounted by means of cones 3 and 4 and ball bearings 5 and 6. Bearings 6 engage the inner surface of axial extension 7 of said hub 2. Within said hub and formed in said axle is a hydraulic cylinder 8 in which piston 9, carrying brake shoe 10, is adapted to be reciprocated. The axle is cored to permit the entrance of hydraulic fluid at 11. For further details of the construction and operation of such hydraulic brake, reference is made to the above-identified Mueller application Serial No. 323,773.

Peripheral flanges 12 and 13 are provided with holes 14 to receive the wire spokes of a wheel. Rear frame members 15 and 16 are secured on the axle on either side of such hub.

Rotatably mounted on the exterior surface of said axial extension 7 of the hub is a sprocket wheel 17 adapted to be driven by a drive chain in the ordinary manner. Cylindrical pins 20 fit loosely within tapered cavities 19 and are kept in place by means of retaining rings 21 and 22. Retaining ring 21 has been removed from the assembly as shown in Fig. 2. Obviously when sprocket 17 is revolved in a clockwise manner relative to hub 2 and its extension 7, pins 20 will engage the tapered walls of their cavities and the surface of such extension locking the sprocket in driving engagement with the hub. Conversely, such pins will ride freely in their cavities upon relative rotative movement of hub and sprocket in an opposite direction.

The present construction presents several important improvements over the free wheeling devices previously employed in the art. In the first place, the pins 20 present a much larger contact surface than the balls usually employed, so that wear is not nearly so great and the likelihood of distortion of the surfaces engaged is lessened.

In the second place, such sprocket and drive pins are mounted on the axial extension of the hub substantially in a plane with one set of the main wheel bearings so that the various moving and engaged surfaces called upon to bear the brunt of severe shocks and strains are mutually supported clear to the axle. In the third place, the device of this invention, as illustrated in Fig. 1, is extremely simple of assembly so that should replacement or repair of parts become desirable the same may be effected with a minimum of time and labor. In the fourth place, such device is adapted to withstand the severe strains and stresses encountered when employing hydraulic braking means of the type disclosed and are therefore particularly intended for such purpose. It will be seen therefore that a novel and useful free wheeling device for bicycles has been provided which is designed to greatly reduce the difficulties previously encountered by employing such devices in bicycles.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:

A free wheeling device for bicycles and the like comprising an axle, a wheel hub mounted on said axle, bearings supporting said hub on said axle, a sprocket rotatably mounted on an axial extension of said hub in a plane with one set of said bearings, a plurality of spaced cavities in the inner periphery of said sprocket, said cavities also being in a plane with such set of bearings, the inner walls of said cavities being tapered in like manner, and cylindrical pins in said cavities adapted to engage said tapered walls and the surface of such hub upon relative rotation of such hub and sprocket in one direction and to ride freely in said cavities upon relative rotative movement of said hub and sprocket in the other direction.

HARRY W. KRANZ.